United States Patent
Yasumatsu

(10) Patent No.: US 7,293,469 B2
(45) Date of Patent: Nov. 13, 2007

(54) ELECTROMAGNETIC FLOW METER HAVING ELECTROPOLISHED ELECTRODES

(75) Inventor: Akio Yasumatsu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 174 days.

(21) Appl. No.: 11/132,806

(22) Filed: May 18, 2005

(65) Prior Publication Data

US 2005/0268730 A1   Dec. 8, 2005

(30) Foreign Application Priority Data

May 20, 2004 (JP) .............................. 2004-150330
Dec. 14, 2004 (JP) .............................. 2004-360820

(51) Int. Cl.
*G01F 1/58* (2006.01)
(52) U.S. Cl. .................................................. 73/861.12
(58) Field of Classification Search .................... None
See application file for complete search history.

(56) References Cited

U.S. PATENT DOCUMENTS

| | | |
|---|---|---|
| 3,180,144 A | 4/1965 | Bennett |
| 4,517,846 A | 5/1985 | Harrison et al. |
| 4,736,634 A * | 4/1988 | Amata ...................... 73/861.12 |
| 5,269,191 A * | 12/1993 | Wada ....................... 73/861.12 |

FOREIGN PATENT DOCUMENTS

| | | |
|---|---|---|
| GB | 1 288 912 A | 9/1972 |
| JP | 63180419 | 7/1988 |
| WO | WO 03/088352 A1 | 10/2003 |

OTHER PUBLICATIONS

"Influence of the core material polishing on the fluxset sensor's operation" by Vertesy, G et al.; Jun. 2000.*
Keisuke Kihara et al., "The Electrochemical Behavior of the Electrode for Electromagnetic Flowmeters," 36th Proceedings of the Japan Joint Automatic Control Conference, Oct. 27-29, 1993, pp. 415-416 (with English Abstract).
Sanwa Co., Ltd., "Technical Information," (with concise explanation in English).
European Search Report dated Sep. 2, 2005.

* cited by examiner

*Primary Examiner*—Harshad Patel
(74) *Attorney, Agent, or Firm*—John J. Penny, Jr.; Edwards Angell Palmer & Dodge LLP

(57) ABSTRACT

An electromagnetic flowmeter has a measuring tube through which a fluid to be measured flows, a magnetic field applying section which applies a magnetic field to the fluid to be measured, and a couple of electrodes which pick up an electromotive force generated according to a flow rate of the fluid to be measured, wherein each of the electrodes has an interface processed by electropolishing.

8 Claims, 4 Drawing Sheets

ELECTROMAGNETIC FLOW METER HAVING ELECTROPOLISHED ELECTRODES

CROSS-REFERENCE TO RELATED APPLICATIONS

This application is based upon and claims the benefit of priority from the prior Japanese Patent Applications No. 2004-150330 filed on May 20, 2004 and No. 2004-360820 filed on Dec. 14, 2004, the entire contents of which are incorporated herein by reference.

BACKGROUND OF THE INVENTION

1. Field of the Invention

The present invention relates to an electromagnetic flowmeter which applies a magnetic field to a fluid to be measured and picks up an electromotive force generated according to a flow rate of the fluid to be measured, and a production method thereof.

2. Description of the Related Art

Related art of electromagnetic flowmeters are normally classified into two groups, i.e., one having a couple of electrodes which have been left cut by a lathe or fine cutter and another having a couple of electrodes which have been cut by a lathe or fine cutter and then mechanically polished (substrate adjustment) with a grinding paper, buff or the like.

Such an electromagnetic flowmeter is arranged to allow the electrodes to pick up an electromotive force generated according to the flow rate of a fluid to be measured when a magnetic field is applied to the fluid (not shown). The electrodes of the electromagnetic flowmeter are adapted to pick up an electromotive force.

An electromagnetic flowmeter generates a flow noise when electric charge moves between the surface of the electrodes and the fluid to be measured. It is also known that when the electrodes of an electromagnetic flowmeter are soaked in a fluid to be measured (e.g., water) for a long period of time, the flow noise reduces.

The term "flow noise" as used herein is meant to indicate a noise generated when the fluid to be measured rubs against the lined surface (electrode), i.e., noise generated by electric charge with the movement of a fluid to be measured, remarkably a fluid having a low electrical conductivity and a low viscosity such as alcohol and pure water. In some detail, the flow noise falls when the dynamic viscosity or electrical conductivity of the fluid to be measured rises but rises when the flow rate of the fluid to be measured rises.

Specific flow noise characteristics will be described hereinafter in connection with FIGS. 4 to 6. In these figures, the abscissa indicates the time during which the fluid to be measured flows through the measuring tube of the electromagnetic flowmeter (since the time at which the measuring tube comes in contact with the fluid) and the ordinate indicates the magnitude of flow noise. In these figures, B-1 to B-9, C-1 to C-3 and D-1 to D-3 each indicate the measurements of the respective sample that are dispersed by the difference in properties between electrodes.

FIG. 4 illustrates the flow noise characteristics of a related art electromagnetic flowmeter wherein there is provided a couple of electrodes which have been left as it is lathed.

As can be seen in the characteristics of FIG. 4, the flow noise maintains a high level after the contact of the fluid with the measuring tube of the electromagnetic flowmeter and, even after several hours, doesn't readily fall and is much dispersed.

FIG. 5 illustrates the flow noise characteristics of a related art electromagnetic flowmeter wherein there is provided a couple of electrodes which have been lathed and buffed to smoothen the surface of the substrate.

As can be seen in the characteristics of FIG. 5, the flow noise is large after the contact of the fluid with the measuring tube of the electromagnetic flowmeter, but falls after the lapse of time.

FIG. 6 illustrates the flow noise characteristics of a related art electromagnetic flowmeter wherein there is provided a couple of electrodes which have been lathed and forcedly oxidized in the atmosphere.

As can be seen in the characteristics of FIG. 6, the flow noise is large after the contact of the fluid with the measuring tube of the electromagnetic flowmeter, but falls after the lapse of time. The flow noise in the characteristics of FIG. 6 is larger than that of FIG. 5.

The aforementioned related art of the production method an electromagnetic flowmeter has a step of assembling a couple of electrodes in a measuring tube (product assembly), a step of soaking the electrodes in a fluid to be measured for a predetermined period of time, and a step of correcting the electromagnetic flowmeter.

If the electromagnetic flowmeter has failed in the correcting step, a step of soaking the electrodes again in the fluid to be measured is then executed. Subsequently, a step of correcting the electromagnetic flowmeter is executed.

Some related art of electromagnetic flowmeters has a couple of oxidized electrodes (see, e.g., the following document (1).).

(1) Keisuke Kihara, et al., "Electrode Behavior of Electromagnetic Flowmeter", Oct. 27, 28 and 29, 1993, 36th Proceedings of the Japan Joint Automatic Control Conference, 4,028 pp. 415

However, the electromagnetic flowmeters of the related art generate much flow noise shortly after coming in contact with a fluid. Further, the generated flow noise doesn't readily fall even after the lapse of time from the contact with the fluid. Further, the generated flow noise is much dispersed by the difference in properties between electrodes.

Further, the step of soaking the electrodes of the electromagnetic flowmeter in the fluid to be measured and the step of correcting the electromagnetic flowmeter require much time, it takes long time to produce the electromagnetic flowmeter.

SUMMARY OF THE INVENTION

An object of the invention is to provide an electromagnetic flowmeter which has small flow noise and can be produced in a short period of time and a production method of the electromagnetic flowmeter. Another object of the invention is to provide a stable electromagnetic flowmeter having a high precision and a production method of the electromagnetic flowmeter.

The invention provides an electromagnetic flowmeter, having: a measuring tube through which a fluid to be measured flows; a magnetic field applying section which applies a magnetic field to the fluid to be measured; and a couple of electrodes which pick up an electromotive force generated according to a flow rate of the fluid to be measured, wherein each of the electrodes has an interface processed by electropolishing.

In the electromagnetic flowmeter, each of the electrodes has an interface processed by immersing in the fluid to be measured.

In the electromagnetic flowmeter, the interface processed by the electropolishing is processed by applying a positive DC voltage to the electrodes.

In the electromagnetic flowmeter, the interface processed by the electropolishing is processed by applying an AC voltage to the electrodes.

In the electromagnetic flowmeter, the interface processed by the electropolishing is processed by applying a voltage including a positive DC voltage and an AC voltage superposed on each other to the electrodes.

The invention provides a production method of an electromagnetic flowmeter having a measuring tube through which a fluid to be measured flows, a magnetic field applying section which applies a magnetic field to the fluid to be measured, and a couple of electrodes which pick up an electromotive force generated according to a flow rate of the fluid to be measured, including the steps of: electropolishing the electrodes; and assembling the electrodes in the measuring tube.

The production method of an electromagnetic flowmeter further includes the steps of: immersing the electrodes in the fluid to be measured between the step of electropolishing the electrodes and the step of assembling the electrodes in the measuring tube.

The invention provides an electromagnetic flowmeter, having: a measuring tube through which a fluid to be measured flows; a magnetic field applying section which applies a magnetic field to the fluid to be measured; and a couple of electrodes which pick up an electromotive force generated according to a flow rate of the fluid to be measured, wherein each of the electrodes has an interface which is composed a chromium density higher than iron density at a depth of 50 angstrom or less.

In the electromagnetic flowmeter, each of the electrodes has an interface processed by immersing in the fluid to be measured.

In the electromagnetic flowmeter, each of the interfaces is processed by applying a positive DC voltage to the electrodes.

In the electromagnetic flowmeter, each of the interfaces is processed by applying an AC voltage to the electrodes.

Consequently, an electromagnetic flowmeter which generates small flow noise since shortly after coming in contact with a fluid and can be produced in a short period of time and a production method of the electromagnetic flowmeter can be provided. Further, a electromagnetic flowmeter being stable and having a high precision and a production method of the electromagnetic flowmeter can be provided.

DETAILED DESCRIPTION OF THE PREFERRED EMBODIMENTS

Figure 1:
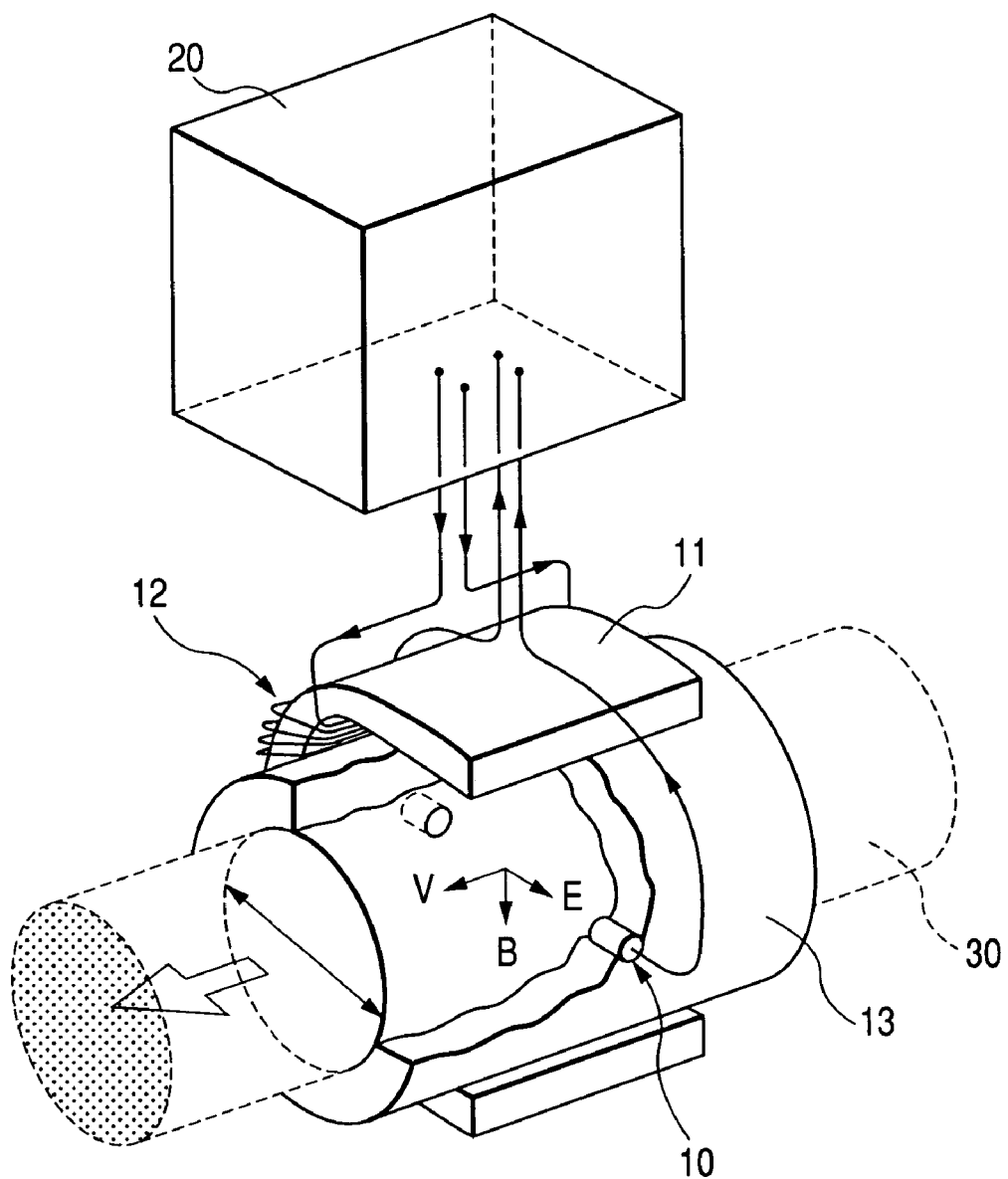
FIG. 1 is a configurational diagram illustrating an embodiment of implementation of the invention.

The invention will be further described hereinafter in connection with FIG. 1. FIG. 1 is a configurational diagram illustrating an embodiment of implementation of the invention.

An electromagnetic flowmeter of the embodiment will be described.

As shown in FIG. 1, the electromagnetic flowmeter has a couple of electrodes 10, a measuring tube 13, a converter 20, a core 11, and an exciting coil 12. Each of the electrodes 10 is assembled in the measuring tube 13. The electrodes 10 are electrically connected to the converter 20. Further, the core 11 and the exciting coil 12 are formed adjacent to the measuring tube 13. The exciting coil 12 is electrically connected to the converter 20. Further, a fluid to be measured 30 (e.g., water) flows through the measuring tube 13.

The core 11 and the exciting coil 12 apply a magnetic field to the fluid to be measured 30. The electrodes 10 pick up an electromotive force generated according to the flow rate of the fluid to be measured 30. Further, the converter 20 outputs a signal corresponding to the flow rate of the fluid to be measured 30. Thus, in the embodiment, the flow rate of the fluid 30 is measured.

The configuration of the electrodes 10 will be described hereinafter.

The surfaces of the electrodes 10 have an interface processed by electropolishing. Further, the electrodes 10 are made of stainless steel.

The electropolishing will be described hereinafter.

The electropolishing is a technique for forming an extremely smooth and glossy surface by making use of anode dissolution phenomena, i.e., characteristic that when electric current flows through stainless steel or the like in an electrolytic solution, a raised portion dissolves earlier than an indented portion.

For example, when DC current flows through the electrodes 10 as an anode (plus), that is, a positive DC voltage is applied to the electrodes 10 in a solution in which a metal cannot be difficultly dissolved because of little water content, such as concentrated phosphoric acid and concentrated sulfuric acid, the surfaces of the electrodes 10 are chemically dissolved to a thickness on the order of micrometer to form an interface thereon. In other words, the surfaces of the electrodes 10 are electropolished so that it is electrochemically dissolved to a thickness on the order of an angstrom (Å) to form an interface thereon.

In some detail, when electrolysis proceeds, the electrolyte in the vicinity of the surfaces of the electrodes 10 have their metal ions concentrated, making it more difficult for metal to dissolve. And, when the attempt is made to force the metal to be dissolved by passing DC current through the electrodes 10, the raised portion is preferentially dissolved because electric current can easily flow through the raised portion but does not easily flow through the indented portion. Therefore, the interfaces of the electrodes 10 are smoothened by electropolishing.

Further, foreign matters on the interfaces of the electrodes 10 are removed away by dissolution by electropolishing. Moreover, the interfaces of the electrodes 10 have their chromium concentration raised when electropolished. In other words, the interfaces of the electrodes 10 have chromium-rich layers processed thereon.

Figure 2A:
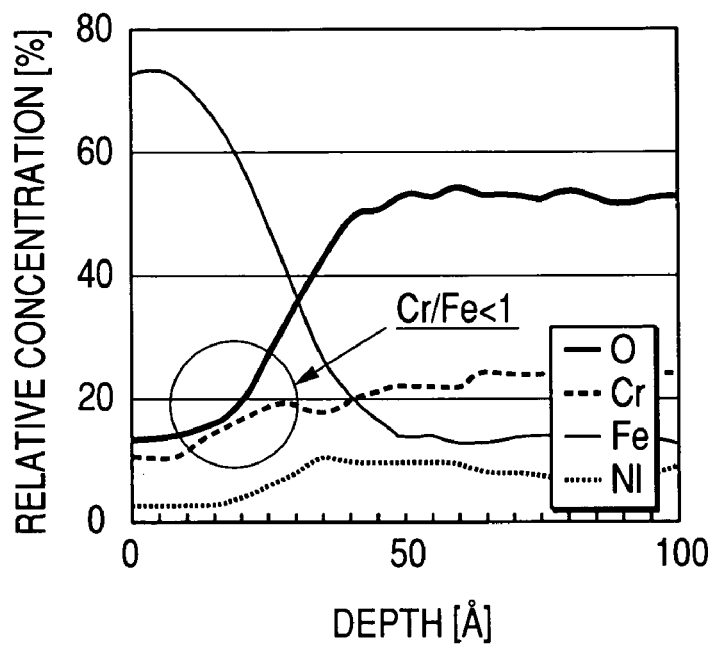
FIGS. 2A and 2B are configurational diagrams of the interface of the electrode 10 according to an embodiment of FIG. 1.
Figure 2B:
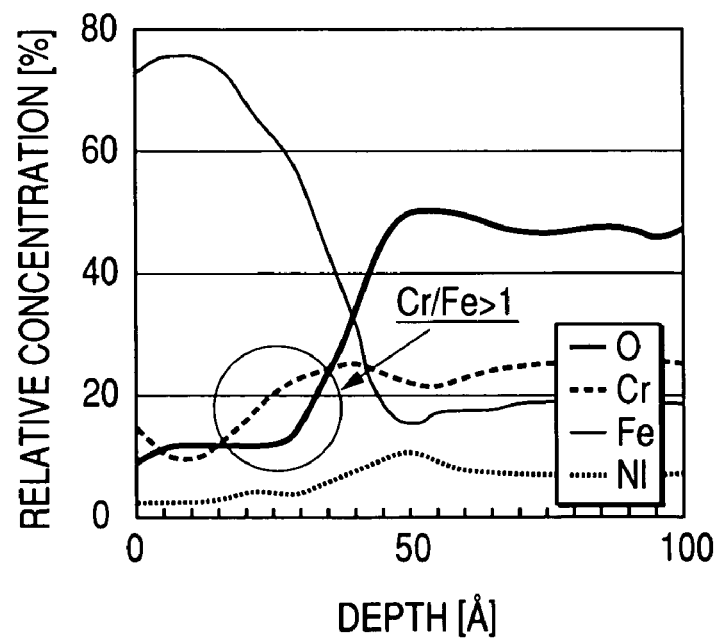

The interfaces of the electrodes 10 will be described hereinafter in connection with FIGS. 2A and 2B. FIGS. 2A and 2B are configurational diagrams of the interfaces of the electrodes 10 according to the embodiment of FIG. 1. FIG. 2A illustrates the interfaces of the electrodes 10 before electropolishing. FIG. 2B illustrates the interfaces of the electrodes 10 after electropolishing. Further, in FIGS. 2A and 2B, the abscissa indicates the depth from the interface, and the ordinate indicates the relative ratio of components.

Before electropolishing, the density of chromium (Cr) is much lower than the density of iron (Fe) (Cr/Fe<1) as shown in FIG. 2A. However, after electropolishing, there occurs a region where the density of chromium (Cr) is higher than the density of iron (Fe) (Cr/Fe>1) at a depth of approximately 25 angstroms [Å] as shown in FIG. 2B.

It was newly confirmed experimentally that an electromagnetic flowmeter having electrodes 10 having interfaces thus processed by electropolishing generates small flow noise.

When the electrodes 10 were immersed in a fluid to be measured (water) shortly after the formation of interfaces on the electrodes 10 by electropolishing, the resulting electromagnetic flowmeter generated much less flow noise.

More specifically, when the electrodes 10 were immersed in a fluid to be measured (water) shortly after the formation of an interface thereon by electropolishing, a dense interface adaptable to the fluid to be measured was processed. Once processed, the dense interface adaptable to the fluid to be measured maintained its adaptability to the fluid to be measured even when allowed to stand in the atmosphere.

It was newly confirmed experimentally that an electromagnetic flowmeter having electrodes 10 having such a dense interface adaptable to the fluid to be measured generates much less flow noise.

Further, when a positive DC voltage is applied to the electrodes 10, the surfaces of the electrodes 10 have a passivity film processed thereon to exhibit an enhanced corrosion resistance. In other words, the surfaces of the electrodes 10 are protected by a chromium oxide film or the like to have stabilized characteristics.

Figure 3:
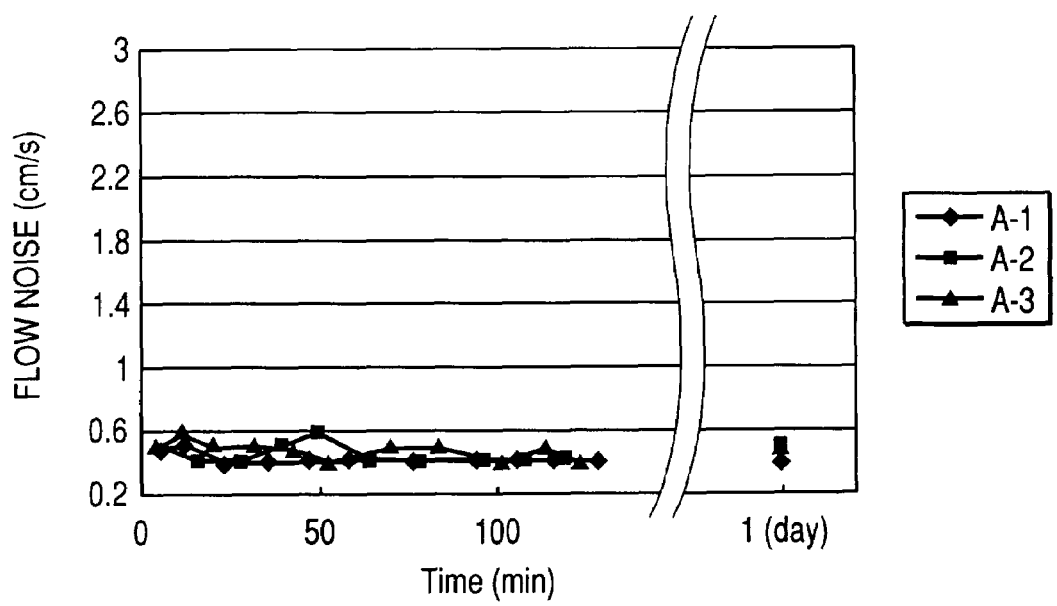
FIG. 3 illustrating the flow noise characteristics of the embodiment of FIG. 1.
Figure 4:
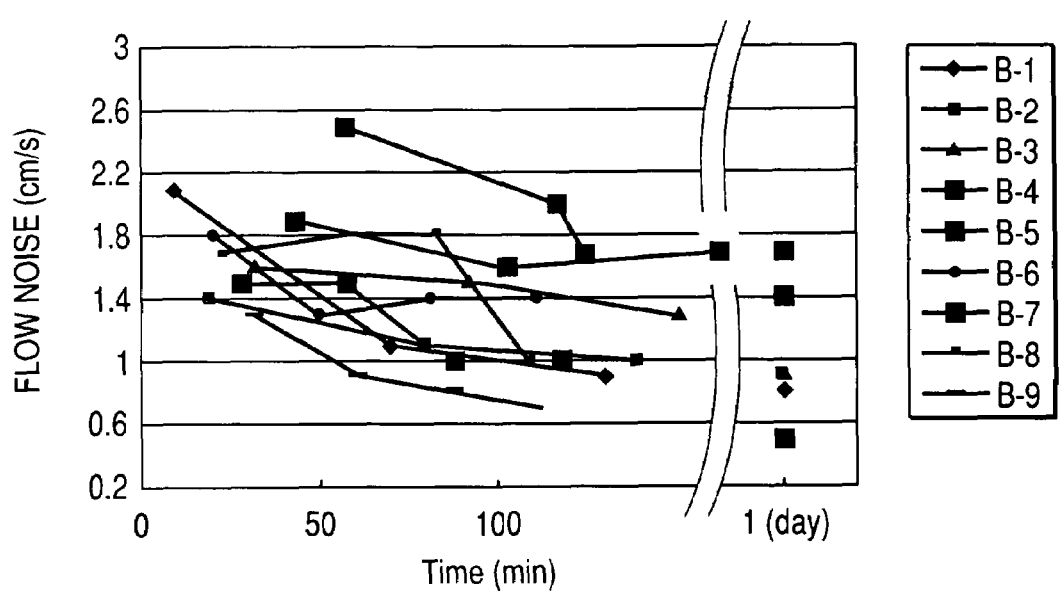
FIG. 4 illustrates the flow noise characteristics of a related art electromagnetic flowmeter (left as it is lathed)
Figure 5:
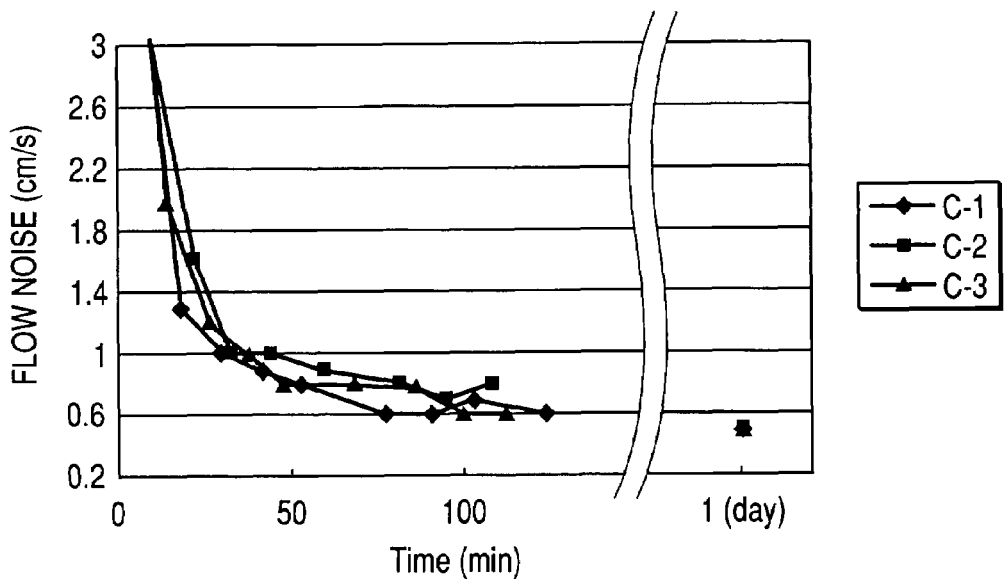
FIG. 5 illustrates the flow noise characteristics of a related art electromagnetic flowmeter (lathed and buffed)
Figure 6:
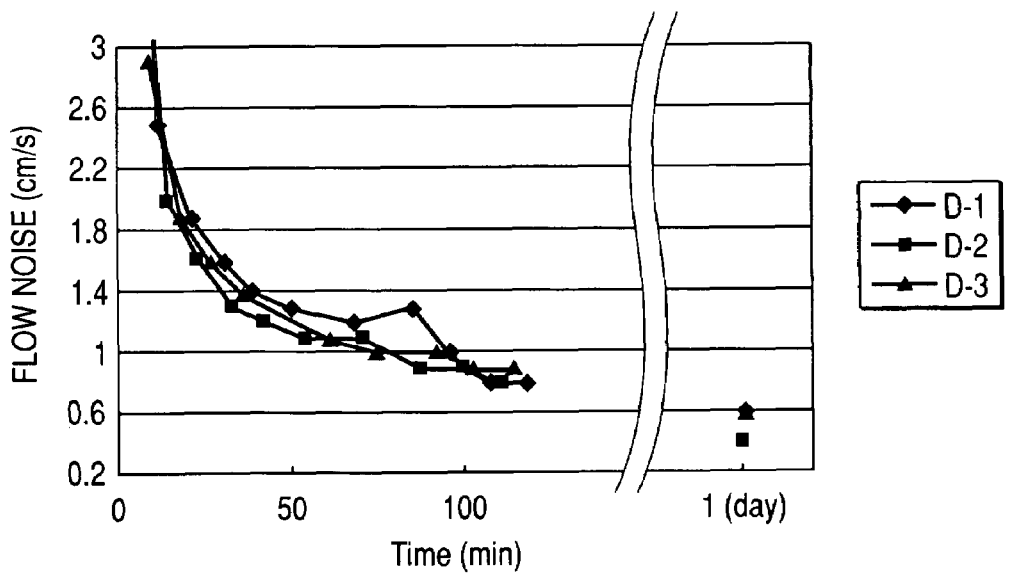
FIG. 6 illustrates the flow noise characteristics of a related art electromagnetic flowmeter (lathed and oxidized in the atmosphere).

Detailed flow noise characteristics will be further described hereinafter in connection with FIG. 3. FIG. 3 illustrates the flow noise characteristics of the embodiment of FIG. 1 wherein the electromagnetic flowmeter has electrodes 10 obtained by lathing a metal, electropolishing the metal thus lathed, and then immediately immersing the material in a fluid to be measured (water) for a predetermined period of time (e.g., 4 days). The characteristics of FIG. 3 correspond to that of FIGS. 4 to 6. In FIG. 3, A-1 to A-3 each indicate the measurements of the respective sample that are dispersed by the difference in properties among electrodes.

As can be seen in the characteristics of FIG. 3, the flow noise has a small magnitude and dispersion after starting of flow of the fluid to be measured 30 through the measuring tube 13 of the electromagnetic flowmeter.

As can be seen in the foregoing description, the embodiment of FIG. 1 has a small flow noise after coming in contact with the fluid and exhibits high precision and stabilized characteristics. Further, in the embodiment of FIG. 1, accurate correction was easily made shortly after assembly of product.

On the other hand, when the electrodes 10 which have been electropolished to form an interface thereon is allowed to stand in the atmosphere, the electrodes 10 are oxidized by the air to form an interface which can be difficult to adapt to the fluid to be measured. The interface processed by allowing the electrodes 10 to stand in the atmosphere (which can be difficult to adapt to the fluid to be measured) differs from the interface processed by immediately immersing the aforementioned electrodes 10 in the fluid to be measured (which is adaptable to the fluid to be measured).

A process for the production of an electromagnetic flowmeter according to the invention will be described hereinafter.

Firstly, steps of lathing the surfaces of the electrodes 10 and then electropolishing the electrodes 10 are executed. An interface is processed on the surfaces of the electrodes 10 by electropolishing. At this time, the surfaces of the electrodes 10 are smoothened.

Secondly, a step of assembling the electrodes 10 in the measuring tube 13 is executed. Thirdly, a step of correcting the electromagnetic flowmeter is executed.

A process for the production of another electromagnetic flowmeter according to the invention will be described hereinafter.

Firstly, steps of lathing the surfaces of the electrodes 10 and then electropolishing the electrodes 10 are executed. An interface is processed on the surfaces of the electrodes 10 by electropolishing.

Secondly, a step of immersing the electrodes 10 in a fluid to be measured is executed. Specifically, the electrodes 10 are immersed in a fluid to be measured (water) shortly after the formation of an interface by electropolishing. A dense interface adaptable to the fluid to be measured is processed on the surfaces of the electrodes 10.

Thirdly, a step of assembling the electrodes 10 in the measuring tube 13 is executed. Fourthly, a step of correcting the electromagnetic flowmeter is executed.

The aforementioned process for the production of an electromagnetic flowmeter can be previously prepared before the assembly of the electrodes 10 in the measuring tube 13. Therefore, the time required for production can be reduced. Further, the time required to execute the step of correcting the electromagnetic flowmeter can be reduced.

Separately of the aforementioned embodiments, a first step of lathing the surfaces of the electrodes 10 and then buffing the electrodes 10 is executed. A second step of electropolishing the surfaces of the electrodes 10 is then executed. A third step of assembling the electrodes 10 in the measuring tube 13 is then executed. A fourth step of correcting the electromagnetic flowmeter is then executed.

The surface conditions of the electrodes 10 treated in these steps will be further described. The external appearance of the surfaces of the electrodes 10 which has been buffed is mirror-like but is observed to have overlapped portions processed thereon and an abrasive and other foreign matters attached thereto. The external appearance of the surfaces of the electrodes 10 which has been then electropolished is not mirror-like but is observed to be free of these overlapped portions, abrasive and foreign matters. Further, the surfaces of the electrodes 10 have chromium-rich layers processed thereon.

It was newly confirmed experimentally that when these steps are executed, the surfaces of the electrodes 10 are further smoothened and the resulting electromagnetic flowmeter thus generates much less flow noise. The effect of buffing on the flow noise of the electromagnetic flowmeter is smaller than the effect of electropolishing on the flow noise of the electromagnetic flowmeter.

While the aforementioned embodiments have been described with reference to the case where electropolishing involves the application of a positive DC voltage to the electrodes, electropolishing may involve the application of an AC voltage to the electrodes.

A specific embodiment of the aforementioned process for the production of an electromagnetic flowmeter will be described hereinafter. Firstly, a step of lathing the surfaces of the electrodes 10 and then electropolishing the electrodes 10 is executed. During this procedure, an AC voltage is applied to the electrodes 10. Secondly, a step of immersing the electrodes 10 in a fluid to be measured shortly after electropolishing is executed. Thirdly, a step of assembling the electrodes 10 in the measuring tube 13 is executed. Fourthly, a step of correcting the electromagnetic flowmeter is executed.

In the foregoing embodiments, the passivity film on the surfaces of the electrodes 10 is destroyed. It was newly confirmed experimentally that the electrodes 10 can form thereon a dense interface adaptable to the fluid to be measured in a shorter period of time. In other words, the time required to execute the step of immersing the electrodes 10 in the fluid to be measured can be further reduced. The time required to produce the electromagnetic flowmeter can be further reduced.

Further, when electropolishing involves the application of a positive DC voltage and an AC voltage to the electrodes, a dense corrosion-resistant interface adaptable to the fluid to be measured can be processed on the surfaces of the electrodes 10. The electromagnetic flowmeter according to this embodiment generates small flow noise and exhibits stabilized characteristics.

While the embodiment has been described with reference to the case where the electrodes are made of stainless steel, the electrodes may be made of a material which forms a passivity film in the air such as tantalum and titanium to attain substantially the same constitution as mentioned above and hence the same effect and advantage as mentioned above.

As mentioned above, the invention is not limited to the embodiment and various changes and modifications can be made therein without departing from the spirit and scope thereof.

What is claimed is:

1. An electromagnetic flowmeter, comprising:
   a measuring tube through which a fluid to be measured flows;
   a magnetic field applying section which applies a magnetic field to the fluid to be measured; and
   a couple of electrodes which pick up an electromotive force generated according to a flow rate of the fluid to be measured,
   wherein each of the electrodes has an electropolished interface, wherein the electropolished interface includes a passivity film, said passivity film being formed by applying a positive DC voltage to the electrodes.

2. The electromagnetic flowmeter according to claim 1, wherein each of the electrodes has an interface processed by immersing in the fluid to be measured.

3. The electromagnetic flowmeter according to claim 1, wherein the electropolished interface is a dense interface, the dense interface is formed by applying an AC voltage to the electrodes.

4. The electromagnetic flowmeter according to claim 1, wherein the electropolished interface is a dense corrosion resistant interface, said corrosion resistant interface is formed by applying a voltage including a positive DC voltage and an AC voltage superposed on each other to the electrodes.

5. An electromagnetic flowmeter, comprising:
   a measuring tube through which a fluid to be measured flows;
   a magnetic field applying section which applies a magnetic field to the fluid to be measured; and
   a couple of electrodes which pick up an electromotive force generated according to a flow rate of the fluid to be measured,
   wherein each of the electrodes has an interface which has a chromium density higher than iron density at a depth of 50 angstrom or less.

6. The electromagnetic flowmeter according to claim 5, wherein each of the electrodes has an interface processed by immersing in the fluid to be measured.

7. The electromagnetic flowmeter according to claim 5, wherein each of the interfaces is processed by applying a positive DC voltage to the electrodes.

8. The electromagnetic flowmeter according to claim 5, wherein each of the interfaces is processed by applying an AC voltage to the electrodes.

* * * * *